Patented May 15, 1934

1,958,648

UNITED STATES PATENT OFFICE 1,958,648

CONVERSION OF METHANE INTO LIQUID HYDROCARBONS

Christian Steigerwald, Ludwigshafen-on-the-Rhine, Germany, assignor to I. G. Farbenindustrie Aktiengesellschaft, Frankfort-on-the-Main, Germany No Drawing. Application February 16, 1931, Serial No. 516,218. In Germany February 28, 1930

4 Claims. (Cl. 260—168)

The present invention relates to the conversion of methane into liquid hydrocarbons and has particular reference to the catalysts to be employed in this process.

According to a new process for the conversion of methane or gas mixtures containing methane such as natural gas, coke oven gas or fractions of such gases into liquid hydrocarbons by thermal treatment at temperatures of from about 800° to 1200° C. chromium, molybdenum, tungsten or alloys of these metals with each other or graphite or materials coated with the said substances are employed as the constructional materials.

I have now found that the said conversion is very advantageously carried out in chambers in the interior of which are arranged catalysts which either consist of or are coated with chromium or graphite. The walls of the reaction chamber may also be constructed of the said materials or may consist of any other refractory materials.

It has been found to be especially advantageous to supply the heat necessary for carrying out the reaction not externally through the walls of the vessel but to heat the catalyst arranged in the interior of the reaction chamber directly, as for example by means of an electric current passed through the said catalysts. An advantage of working in this manner consists in the fact that, as already stated, any refractory material may be used for the construction of the reaction vessel without the danger of any appreciable deposition of carbon black since the greatest amount of heat is not evolved at the vessel walls but in the interior of the vessel. Further advantages of the employment of directly heated catalysts consist in the better transfer and utilization of heat and in the fact that the very hot gases may be suddenly cooled directly after leaving the hottest place so that better yields of liquid products are obtained while in the case of the supply of heat through the walls of a reaction tube a sudden cooling of the said kind is only effected with difficulty.

The following examples will further illustrate the nature of this invention, but the invention is not restricted to these examples.

Example 1

A gas containing 85 per cent of methane is passed with a velocity of flow of 20 liters per hour through a quartz tube having an inner diameter of 30 millimeters, in the middle of which is mounted vertically and in a cross-like form another quartz tube of the same dimensions containing a chromed iron rod 5 millimeters in diameter and 10 centimeters in length which is electrically heated to about 1100° C. After a short time the formation of a dense, yellowish brown mist sets in. 50 grams of a condensate of which about half consists of benzene while the other half is a thinly liquid tar, is obtained from the cooled gases leaving the tube. From each cubic meter of gas about 2 grams of lustrous carbon are deposited on the chromed iron rod. From time to time this carbon falls off from the rod and is carried away by the stream of gas.

Example 2

40 cubic meters of a gas containing 85 per cent of methane are passed per hour through a reaction chamber 3.75 meters in height and 25 square centimeters in internal cross-section which is filled with 110 kilograms of graphite which is present in the form of rods and which is heated to 1200° C. by hot reducing gases periodically blown into the chamber. 20 grams of a liquid product containing 70 per cent of benzene are obtained from each cubic meter of initial gas. The gas leaving the reaction space contains 65 per cent of unchanged methane.

What I claim is:—

1. A process of producing liquid hydrocarbons which comprises bringing a gas comprising essentially methane at a temperature between about 800° and 1200° C. into contact with chromium.

2. A process of producing liquid hydrocarbons which comprises bringing a gas comprising essentially methane at a temperature between about 800° and 1200° C. into contact with chromium and supplying the heat necessary for said reaction by heating the contact mass directly.

3. A process of producing liquid hydrocarbons which comprises bringing a gas comprising essentially methane at a temperature between about 800° and 1200° C. into contact with chromium and supplying the heat necessary for said reaction by heating the contact mass directly by means of an electric current passed through said contact mass.

4. A process of producing liquid hydrocarbons which comprises bringing methane at a temperature between about 800° and 1200° C. into contact with chromium.

CHRISTIAN STEIGERWALD.